United States Patent [19]

Yamaguchi

[11] Patent Number: 4,927,592
[45] Date of Patent: May 22, 1990

[54] REVERSED FIELD PINCH APPARATUS

[75] Inventor: Sataro Yamaguchi, Tokyo, Japan

[73] Assignee: Mitsubishi Denki Kabushiki Kaisha, Japan

[21] Appl. No.: 218,162

[22] Filed: Jul. 13, 1988

[30] Foreign Application Priority Data

Jul. 16, 1987 [JP] Japan ................... 62-175814

[51] Int. Cl.$^5$ ............................... G21B 1/00
[52] U.S. Cl. ..................... 376/123; 376/133; 376/132; 376/142; 376/150
[58] Field of Search ............ 376/133, 142, 150, 123, 376/132

[56] References Cited

U.S. PATENT DOCUMENTS

| | | |
|---|---|---|
| 3,778,343 | 12/1973 | Coppi et al. . |
| 3,779,864 | 12/1973 | Kaw et al. . |
| 4,087,322 | 5/1978 | Marcus . |
| 4,543,231 | 9/1985 | Ohkawa ................. 376/133 |
| 4,560,528 | 12/1985 | Ohkawa ................. 376/133 |
| 4,689,192 | 8/1987 | Nagata .................. 376/142 |
| 4,734,247 | 3/1988 | Schaffer ................ 376/133 |
| 4,762,659 | 8/1988 | Kuno .................... 376/142 |
| 4,762,660 | 8/1988 | Kuno .................... 376/142 |

OTHER PUBLICATIONS

Shimada et al., "TPE-IRM15 Reversed Field Pinch Experiment", Fusion Technology, 1986, vol. 1.
Schoenberg et al., "Oscillating Field Current Drive for Reversed Field Pinch Discharges", Journal of Applied Physics, vol. 56, No. 9, Nov. 1984, pp. 2519-2529.
Controlled Thermonuclear Reactions, R. E. Krieger Pub. Co. Huntington, N.Y., 1975, Glasstone et al., pp. 262-272.
REPUTE-1, annual review, 1984, Faculty of Eng. & Faculty of Science, University of Tokyo, Miyamoto et al., pp. 3-8.

Primary Examiner—Harvey E. Behrend
Attorney, Agent, or Firm—Leydig, Voit & Mayer

[57] ABSTRACT

A reversed field pinch apparatus is equipped with a first OH coil and a second OH coil which are inductively coupled with a plasma. The first OH coil is supplied a low-level alternating current for performing F-O pumping, while the second OH coil is supplied a high-level direct current for forming a plasma current.

10 Claims, 4 Drawing Sheets

REVERSED FIELD PINCH APPARATUS

BACKGROUND OF THE INVENTION

This invention relates to a reversed field pinch apparatus for controlling a plasma in nuclear fusion experiments, and more particularly, it relates to a reversed field pinch apparatus which employs F-Θ pumping.

A reversed field pinch apparatus is an axisymmetric toroidal confinement device characterized by a highly sheared magnetic field such that the toroidal field on the exterior of a plasma is reversed with respect to its value at the center of the plasma. FIG. 1 is a vertical cross-sectional view of a conventional reversed field pinch apparatus which is disclosed in "Fusion Technologies" by T. Shimada et al. (1986, Vol. 1, pp. 665–672, in Japanese). As shown in this figure, a toroidal plasma 1 of constant radius is symmetrically formed about the z axis. The direction of the plasma current $I_p$ flowing through the plasma 1 is indicated by $\phi$ in the figure. The plasma 1 is confined with a donut-shaped vacuum vessel 2, which is surrounded by a donut-shaped conducting shell 3 which is for the purpose of stabilizing the plasma 1. The shell 3 is surrounded by a toroidal field coil 5 which generates a toroidal magnetic field along the plasma 1 in the $\phi$ direction in order to completely stabilize the plasma 1.

A plurality of annular ohmic heating (OH) coils 6 are coaxially disposed with respect to the z axis on the outside of the toroidal field coil 5. The OH coils 6 are connected in series with one another. These OH coils 6 generate a magnetic field in the z direction, and the variation with respect to time of the magnetic field induces an electric field in the $\phi$ direction which produces a plasma current in the $\phi$ direction. The OH coils 6, which are also referred to as primary coils, are inductively coupled with the plasma current $I_p$ and drive the plasma current $I_p$ by transformer action.

Inner vertical field coils 7 and outer vertical field coils 8 are disposed on either side of the toroidal field coil 5. Currents of opposite polarity are passed through these coils 7 and 8 to generate a vertical magnetic field in the z direction in a location corresponding to the plasma 1. These coils achieve an electromagnetic force balance of the plasma 1 in the vertical and horizontal directions.

The operation of this conventional reversed field pinch apparatus will now be explained while referring to the waveform diagrams of FIG. 2. First, at time $t_o$, a toroidal field coil current $I_T$ begins to be passed through the toroidal field coil 5. As the toroidal current $I_T$ is increased, a toroidal magnetic field is generated in the region in which the plasma 1 is to be formed.

Next, at time $t_1$, the OH coil current $I_o$ flowing through the OH coils 6 is suddenly increased from zero. This current $I_0$ induces a voltage which causes a plasma current $I_T$ to flow. At the same time, the toroidal field coil current $I_T$ is lowered, and then reversed in direction. As a result, the plasma 1 takes on a reversed field pinch configuration in which the direction of the toroidal magnetic field at the center of the plasma 1 is opposite from its direction on the plasma exterior. In order to suppress fluctuations of the plasma 1 and obtain equilibrium, the vertical field coil current $I_v$ flowing through the vertical field coils 7 and 8 is also increased from zero at time $t_1$.

In this manner, a plasma 1 is formed in the vacuum vessel 2, and a plasma current $I_p$ flows in the $\phi$ direction.

In order to maintain the plasma current $I_p$, the OH coil current $I_0$ should be monotonically increased with respect to time as shown by the solid line in FIG. 2a and an electric field is induced. The OH coil current $I_0$ alone is not sufficient to stabilize the plasma 1, and for this reason, the conducting shell 3 is disposed around the vacuum vessel 2, and the plasma 1 is stabilized by the toroidal field coil current $I_T$ and the vertical field coil current $I_v$. The plasma is extinguished by reducing currents $I_0$, $I_T$, and $I_v$ to zero.

In order to maintain the plasma current $I_p$ without the monotonic increase in OH coil current $I_o$ illustrated in FIG. 2a, the F-Θ pumping technique was recently devised. This is a current drive technique which is described in detail in "Oscillating Field Current Drive for Reversed Field Pinch Discharges" by. K. F. Schoenberg et al. (Journal of Applied Physics, Vol. 56, No. 9, Nov., 1984, pp. 2519–2529). In F-Θ pumping, the operation of a reversed field pinch apparatus is the same as that described above until a plasma current $I_p$ is formed. However, at a subsequent time $t_2$ after the plasma 1 has reached equilibrium, the OH coil current $I_o$, the toroidal field coil current $I_T$, and the vertical field coil current $I_v$ are made to oscillate as shown by the dashed lines in FIG. 2. As a result, the toroidal flux and the voltage which is applied to the plasma 1 oscillate, and the plasma current $I_p$ also oscillates as shown in FIG. 2d. Due to the nonlinearity of the plasma 1, a net dc voltage is generated, and the dc voltage maintains the plasma current $I_p$ in a quasi-steady state.

As shown by the dashed line in FIG. 2a, the above-described F-Θ pumping method makes it possible to maintain the plasma current $I_p$ without a monotonic increase in the OH coil current $I_o$. However, the OH coil current $I_o$ is a large current, and when F-Θ pumping is performed with a conventional reversed field pinch apparatus, a large power supply is necessary in order to make the OH coil current $I_o$ oscillate.

SUMMARY OF THE INVENTION

Accordingly, it is an object of the present invention to provide a reversed field pinch apparatus which does not require a large power supply in order to perform F-Θ pumping.

A reversed field pinch apparatus in accordance with the present invention is equipped with two sets of OH coils. A first OH coil is supplied a low-level alternating current and is used for performing F-Θ pumping, while a second OH coil is supplied a high-level direct current and is used for forming a plasma current. As the first OH coil uses only a small current, F-Θ pumping can be performed without handling a large alternating current, and a large power supply for F-∝ pumping is not necessary.

BRIEF DESCRIPTION OF THE DRAWINGS

In the figures, the same reference numerals indicate the same or corresponding parts.

DESCRIPTION OF THE PREFERRED EMBODIMENTS

Figure 1:
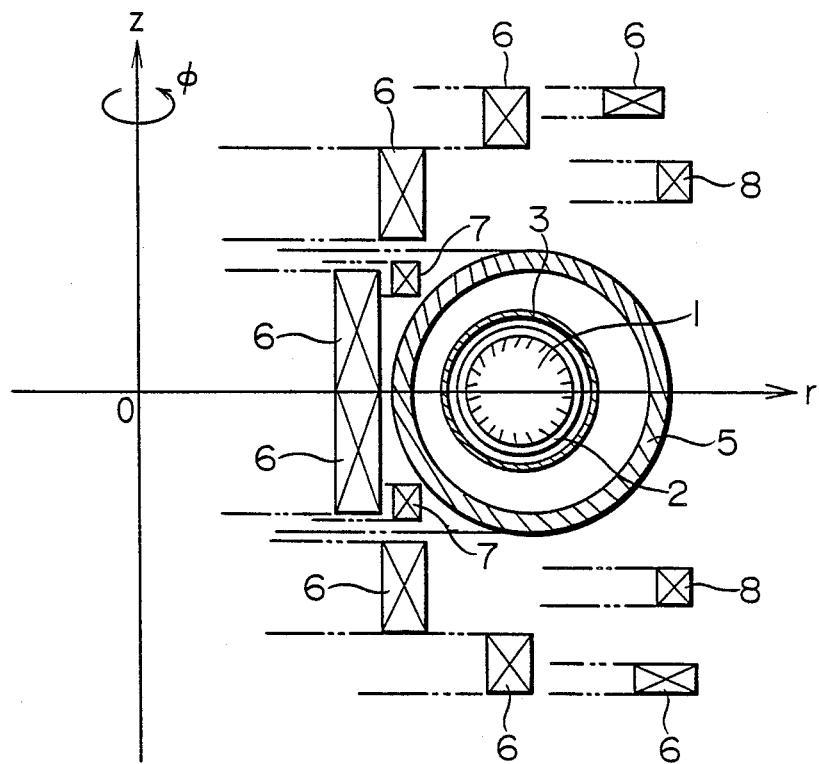
FIG. 1 is a vertical cross-sectional view of a conventional reversed field pinch apparatus.

Hereinbelow, a number of preferred embodiments of the present invention will be described while referring to the accompanying drawings, FIG. 3 of which is a vertical cross-sectional view of a first embodiment. As shown in this figure, the overall structure of this embodiment is similar to that of the conventional apparatus of FIG. 1. However, in addition to a set of OH coils 6 which are disposed on the outside of a toroidal field coil 5, this embodiment is equipped with another OH coil 4 between a conducting shell 3 and the toroidal field coil 5. This OH coil 4, which will be referred to as the first OH coil, is in the form of a conducting shell which coaxially surrounds conducting shell 3 so that a double-shelled structure is formed. The first OH coil 4 is inductively coupled with the plasma current $I_p$. The other OH coils 6 will be referred to as the second OH coils 6. The first OH coil 4 is supplied a lowlevel alternating current and is used for F-Θ pumping, while the second OH coils 6 are supplied a high-level direct current and are used for forming a plasma current.

Figures 2A, 2B, 2C, 2D:
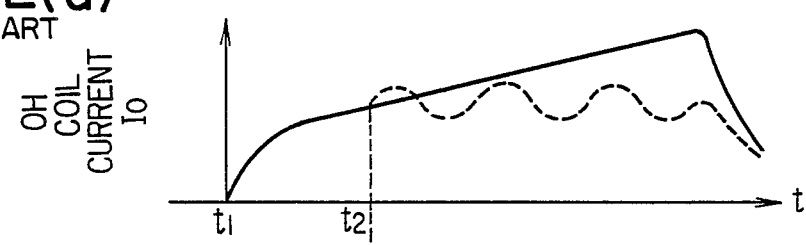
FIGS. 2a–2d are waveform diagrams of the various currents flowing through the coils of the apparatus of FIG. 1.
Figure 4A:
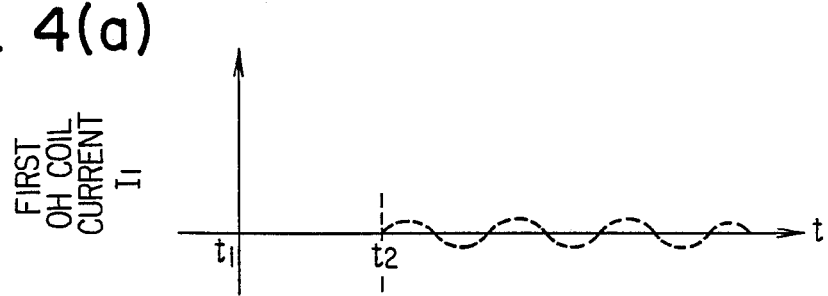
FIGS. 4a and 4b are waveform diagrams of the first and second OH coil currents during the operation of the embodiment of FIG. 3.
Figure 4B:
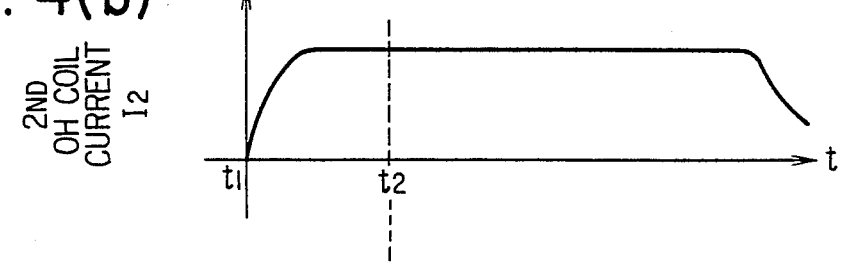

The operation of this embodiment will be described while referring to the waveform diagrams of FIG. 4. Up until the formation of a plasma current $I_p$, the operation of this embodiment is identical to that of the apparatus of FIG. 1. Although not illustrated, the waveforms of the toroidal field coil current $I_T$, the vertical field coil current $I_v$, and the plasma current $I_p$ are the same as those shown in FIG. 2.

At time $t_2$, when the plasma current $I_p$ has reached a quasisteady state, F-Θ pumping is performed by supplying a low-level alternating current $I_1$ centered around zero to the first OH coil 4, as shown by the dashed line in FIG. $4_a$. This alternating current $I_1$ causes the surface voltage of the plasma 1 to alternate. At the same time, a high-level direct current $I_2$ is supplied to the second OH coils 6.

In this manner, discharge due to F-Θ pumping takes place over a long period. As the first OH coil current $I_1$ is of a low amperage, the first OH coil 4 requires only a small power supply. Furthermore, as the first OH coil 4 is in the form of a shell surrounding conducting shell 3, the effect of error fields is reduced, and the plasma 1 can be confined extremely stably.

In the illustrated embodiment, the second OH coil current $I_2$ is raised from zero to a specified value at time $t_1$ when the plasma current $I_p$ is started. However, it is instead possible to energize the second OH coils 6 prior to forming the plasma 1, and if the second OH coil current $I_2$ is suddenly decreased to zero at time $t_1$, an electric field in the cicumferential direciton of the plasma will be induced, and a plasma current $I_p$ will be generated. This mode of operation provides the advantage that the power supply for the second OH coils 6 can be disconnected from the second OH coils 6 and control is greatly simplified.

Figure 3:
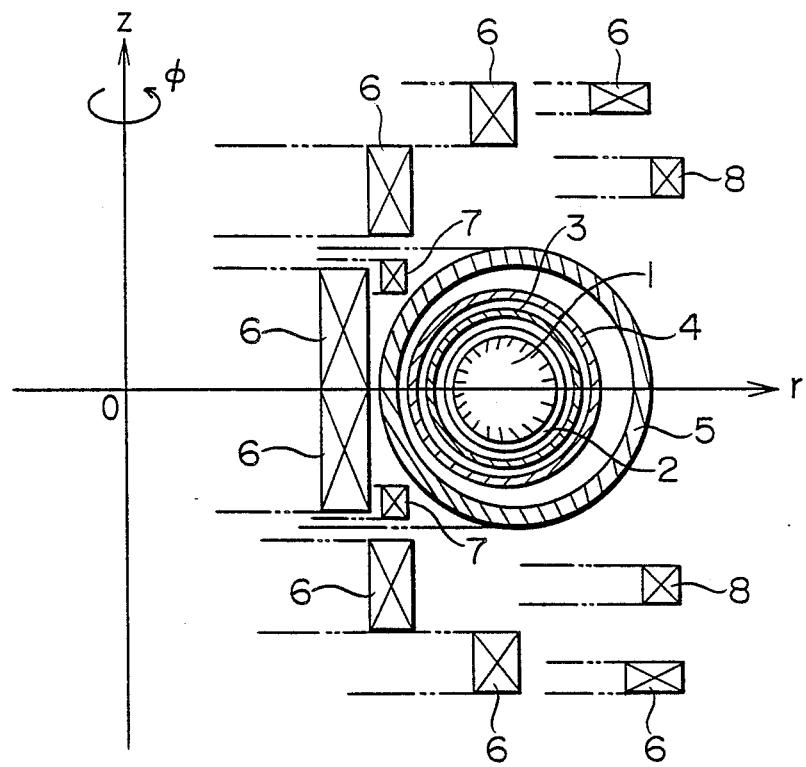
FIG. 3 is a vertical cross-sectional view of a first embodiment of a reversed field pinch apparatus in accordance with the present invention.

In the embodiment of FIG. 3, the first OH coil 4 is used for F-Θ pumping and the second OH coils 6 are used to generate a plasma current $I_p$, but the roles performed by the two sets of coils may be reversed.

Furthermore, instead of being a shell which is coaxial with the plasma 1, the first OH coil 4 can have the same structure as the second OH coils 6.

Figure 5:
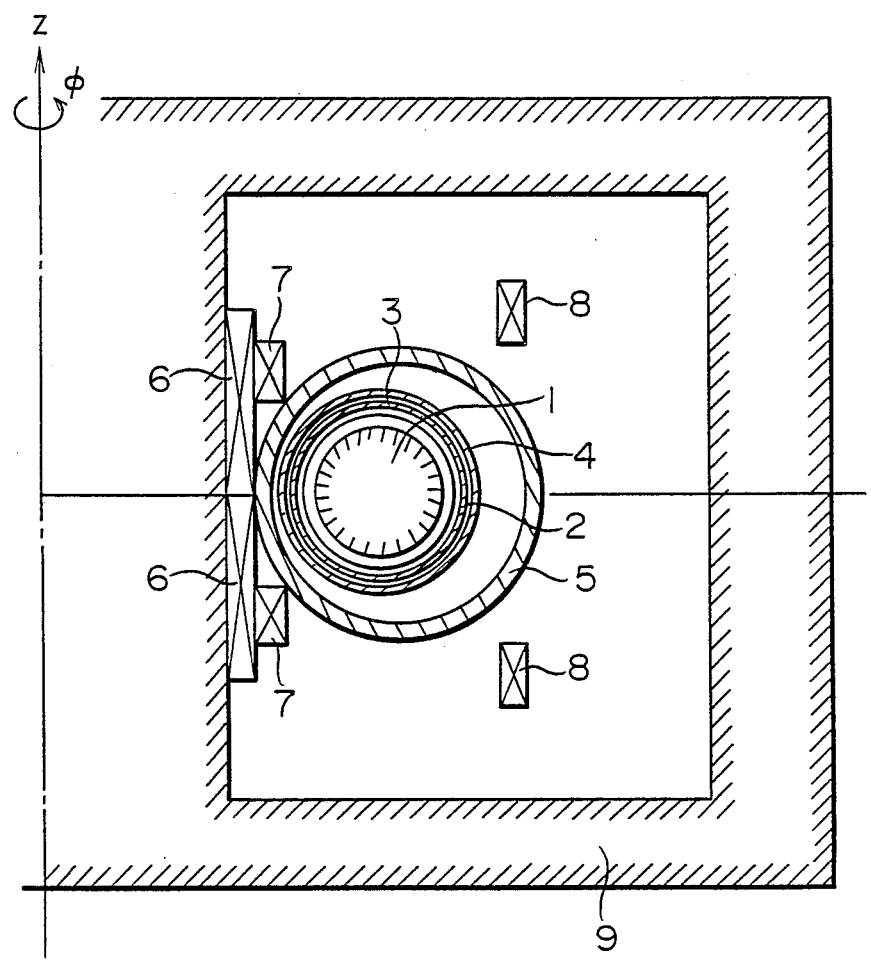
FIG. 5 is a vertical cross-sectional view of a second embodiment of the present invention.

In the preceding embodiment, the first OH coil 4 has an air core. FIG. 5 is a vertical cross-sectional view of a second embodiment of the present invention which employs an iron core 9 for the first OH coil 4 which is coaxial with respect to the plasma 1. The use of an iron core 9 simplifies the installation of the second OH coils 6. This embodiment is otherwise identical in structure to the previous embodiment and it provides the same benefits.

What is claimed is:

1. In a reversed field pinch apparatus including a toroidal vacuum vessel in which a plasma is confined, a coil arrangement comprising:

a first ohmic heating coil means supplying an alternating current for F-Θ pumping, said first coil means including a first coil which is coaxial with respect to said vacuum vessel and is inductively coupled with said plasma and a second ohmic heating coil means supplying a direct current which is greater than the alternating current for generating a plasma current in said plasma, said second coil means including a second coil which is inductively coupled with said plasma.

2. A coil arrangement as claimed in claim 1 wherein the reversed field pinch apparatus further includes a first toroidal conducting shell in which said vacuum vessel is housed and wherein said first ohmic heating coil includes a second toroidal conducting shell inside of which said first toroidal conducting shell is housed.

3. A coil arrangement as claimed in claim 1 further comprising an iron core for said first ohmic heating coil which is coaxially disposed with respect to said vacuum vessel.

4. A coil arrangement as claimed in claim 2 further comprising an iron core for said first ohmic heating coil which is coaxially disposed with respect to said vacuum vessel.

5. In a reversed field pinch apparatus for confining a plasma, a coil arrangement comprising:

first ohmic heating coil means inductively coupled to said plasma and supplying an alternating current having a substantially zero-level direct current component for F-Θ pumping and second ohmic heating coil means inductively coupled to said plasma and supplying a direct current for generating a plasma current.

6. A coil arrangement as claimed in claim 5 wherein the second coil means includes means for generating a plasma current by a direct current which is substantially greater than the alternating current.

7. In a reversed field pinch apparatus which includes a toroidal vacuum vessel in which plasma is contained and a toroidal conducting shell which surrounds the vacuum vessel, a coil arrangement comprising:

a toroidal field coil means for generating a toroidal magnetic field in the plasma, said toroidal field coil means including a toroidal field coil which surrounds the conducting shell;

first ohmic heating coil means supplying an alternating current which has an approximately zero-level direct current component for F-Θ , said second ohmic heating coil means including a coil which surrounds the conducting shell and is positioned between the conducting shell and the toroidal field coil second ohmic heating coil means supplying a direct current which is greater than the alternating current for generating a plasma current, said first ohmic heating coil means including at least one cell coaxially disposed on the outside of the toroidal field coil.

8. A coil arrangement as claimed in claim 7 further comprising inner and outer vertical field coils disposed on either side of the toroidal field coil.

9. A coil arrangement as claimed in claim 8 wherein the second ohmic heating coil means includes a plurality of coils coaxially disposed on the outside of the toroidal field coil and electrically connected in series with one another.

10. A coil arrangement as claimed in claim 7 wherein the first ohmic means further includes an iron core coaxially disposed with respect to the vacuum vessel.

* * * * *